March 29, 1927.
E. P. HULSE
1,622,870
KNIFE
Filed Sept. 14, 1926
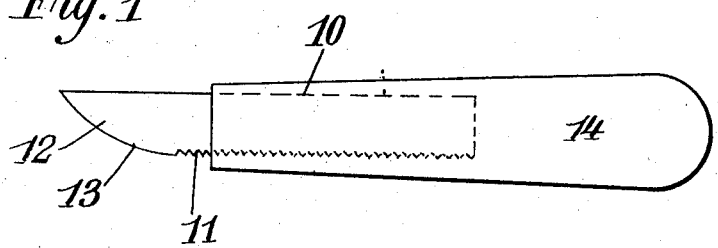
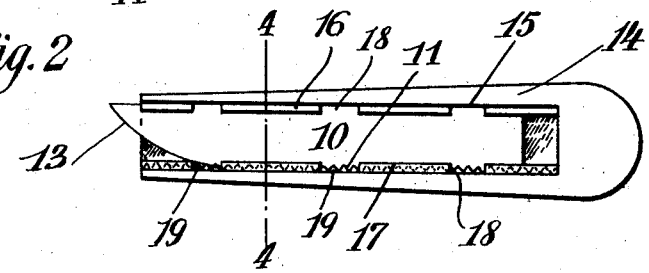
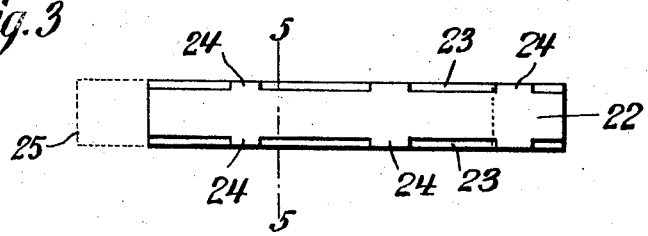
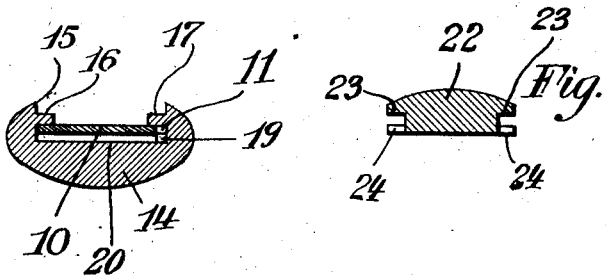
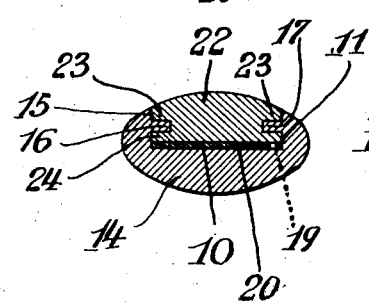
Edward P. Hulse
INVENTOR
BY
Ivan E. A. Konigsberg
ATTORNEY Patented Mar. 29, 1927.

1,622,870

UNITED STATES PATENT OFFICE.

EDWARD P. HULSE, OF WESTFIELD, NEW JERSEY.

KNIFE.

Application filed September 14, 1926. Serial No. 135,310.

This invention relates to knives and the object of the invention is to provide a knife of novel and generally improved construction and arrangement especially suitable for printers' use.

One object of the invention is to provide a knife which in appearance shall imitate the well known hacksawblade knife which is much used by printers.

Another object is to provide a knife having a detachable and adjustable blade so that it may be readily arranged for any particular use or cutting operation.

Still another object is to provide a knife adapted to be manufactured in large quantities at low cost.

Accordingly my invention is embodied in a knife arranged and constructed as hereinafter described and as illustrated in the accompanying drawing in which—

Fig. 1 is a view of a knife embodying my invention.

Fig. 2 is a view of the one half part of the handle showing the knife blade in a position different from that in Figure 1.

Fig. 3 is a view of the second half part of the handle.

Fig. 4 is a view on line 4—4 of Figure 2.

Fig. 5 is a view on line 5—5 of Figure 3.

Fig. 6 is a cross sectional view of the knife.

I propose to make the knife blade from ribbon or band steel and cut the blade in one operation from the main body, and thereafter sharpen the cutting edge.

I also propose constructing the handle from any suitable moldable material and form it in two halves. One of said halves is adapted to receive the blade in adjusted position. The other of said halves is adapted to be placed in position in or on the first half similar to placing a cover on a box, and adapted to firmly clamp the blade in position.

Referring to the drawing the reference numeral 10 designates the knife blade in the form of a relatively long narrow blade having one of its edges toothed or serrated as at 11 and a rounded portion 12 which is sharpened to provide the cutting edge 13.

One half of the handle is in the form of a trough or open box 14 formed with a longitudinal recess or cut out 15 having inwardly projecting flanges 16 and 17 extending the length of the recess and interrupted at spaced intervals as at 18, 18. Underneath the flange 17 and along the bottom corner of the recess there is provided a serrated or toothed edge 19 the height of which is equal to the thickness of a knife blade. The space underneath the flanges between them and the bottom 20 of the recess is twice the thickness of a knife blade.

From this it will be clear and it is illustrated in Figure 4, that a knife blade may be slid into the bottom half of the handle within the recess therein, the blade occupying a position immediately beneath the flanges 16 and 17 but elevated above the bottom 20 in that the serrated edge of the blade rests upon the serrated edge 19 of the handle. Hence the blade may be pushed into the socket to any extent. In other words the blade is longitudinally adjustable of the socket. When the blade has been adjusted it may be pressed against the bottom 20 when the blade teeth 11 will engage the teeth 19 in the handle and whereby further sliding or longitudinal movement of the blade is prevented.

The top portion or cover half of the handle is in the form of a slab 22 which fits into the socket opening. The cover 22 has overhanging flanges 23 adapted to rest on the bottom flanges 16 and 17. It is further provided with short flanges or fins 24 adapted to be pushed down into the spaces 18, 18 and then slid in under the bottom flanges 16 and 17.

In assembling the knife, the blade is slid endwise into the bottom half 14 beneath the flanges 16 and 17. It may then be pressed down flat on the bottom 20 of the socket, or it may be left in the position shown in Figure 4.

Thereafter the top is placed on top of the bottom in a position indicated by the dotted line 25 in Figure 3, when the fins 24 will lie above the spaces 18. The top is then pressed down and moved to one side, to the right in Figure 2, when the fins 24 will slide in under the flanges 16 and 17 and firmly press the blade down into engagement with the toothed edge 19. This is clearly shown in Figure 6 in which it will be seen that the blade is clamped against the bottom 20 and cannot move lengthwise because of the engaged toothed edges 11 and 19.

The knife is disassembled by sliding the top half of the handle outward until the fins 24 will lie in the spaces 18. The top may then be lifted off and the blade taken out or readjusted.

The blade may be entirely concealed within the handle as is obvious. It may also be adjusted lengthwise as shown in Figures 1 and 2.

The handle portions will be molded in large quantities, hence at low cost, and require no further work after being taken from the molds.

While I have shown my invention in its preferred form, nevertheless it will be understood that details may be changed or modified without departing from the principle of the invention and within the scope of the appended claims.

I claim:—

1. As a new article of manufacture, a knife comprising a blade and a handle, said handle consisting of a socket portion and a cover portion, means in said socket portion permitting the blade to be inserted endwise therein, interengaging flanges on the said two handle portions for forming the same into a handle for the blade and to clamp the latter within said socket and means in the latter in engagement with serrations provided in the edge of the blade for preventing accidental longitudinal movement thereof.

2. As a new article of manufacture, a knife consisting of three separate parts, a blade and two handle portions, means integral with the blade and one of said handle portions for adjustably positioning the blade within the handle, and means integral with both of said handle portions for joining the same to form a handle and for clamping the blade therein in its adjusted position.

EDWARD P. HULSE.